United States Patent [19]

Gastinger et al.

[11] Patent Number: 4,721,733

[45] Date of Patent: Jan. 26, 1988

[54] POLYMER POLYOL DISPERSION FROM α,β ETHYLENICALLY UNSATURATED DICARBOXYLIC ACID ANHYDRIDES

[75] Inventors: Robert G. Gastinger, West Chester, Pa.; John E. Hayes, Wilmington, Del.

[73] Assignee: Atlantic Richfield Company, Los Angeles, Calif.

[21] Appl. No.: 23,499

[22] Filed: Mar. 9, 1987

[51] Int. Cl.$^4$ .............................................. C08G 18/14
[52] U.S. Cl. .................................... 521/157; 525/404; 525/539; 528/73; 528/301
[58] Field of Search ............... 521/157; 525/404, 539; 528/73, 301

[56] References Cited

U.S. PATENT DOCUMENTS

| | | | |
|---|---|---|---|
| 3,304,273 | 2/1967 | Stamberger | 521/157 |
| 3,383,351 | 5/1968 | Stamberger | 526/210 |
| 3,523,093 | 8/1970 | Stamberger | 521/157 |
| 3,652,639 | 3/1972 | Pizzini et al. | 521/904 |

*Primary Examiner*—Maurice J. Welsh
*Attorney, Agent, or Firm*—Dennis M. Kozak

[57] ABSTRACT

Stable, fluid polymer polyols made by the free radical polymerization of a monomer mixture of an α,β-ethylenically unsaturated dicarboxylic acid anhydride and a copolymerizable monomer in an organic polyol medium of secondary hydroxyl terminated polyol are disclosed. In one embodiment, the polymer polyols form stable, acrylonitrile-free dispersions.

22 Claims, No Drawings

POLYMER POLYOL DISPERSION FROM α,β ETHYLENICALLY UNSATURATED DICARBOXYLIC ACID ANHYDRIDES

This invention relates to polyurethane polymers. More specifically, this invention relates to polymer polyols used in the preparation of polyurethane polymers.

In one of its more specific aspects, this invention pertains to stable, fluid polymer polyols made by the free radical polymerization of a monomer mixture of an α,β-ethylenically unsaturated acid anhydride and a copolymerizable monomer in an organic polyol medium of secondary hydroxyl terminated polyol. In one embodiment, the polymer polyols of this invention form stable, acrylonitrile-free dispersions.

Graft copolymer dispersions prepared from vinyl monomers and polyether polyols and their use in the preparation of polyurethane polymers are well known. The pioneer patents in the field of polymer polyols are U.S. Pat. Nos. 3,304,273; 3,383,351; Re 28,715; Re 29,118; and 3,523,093 to Stamberger, and U.S. Pat No. 3,652,639 to Pizzini, et al. In the patents to Stamberger, the method involves the in situ polymerization of a nitrile monomer (e.g., acrylonitrile and methacrylonitrile) in high molecular weight ethylene oxide tipped polyols. Pizzini, et al.'s method involves incorporating unsaturation into a polyol to increase the resultant level of grafting onto the polyol. The unsaturated polyol is typically prepared by the reaction of a saturated primary polyol with maleic anhydride followed by capping with ethylene oxide to reduce acidity.

Although the polymer polyols that found initial commercial acceptance were primarily produced from polyols and acrylonitrile, more recently, mixtures of polymer polyols produced from polyols, acrylonitrile, and styrene have been used commercially. U.S. Pat. No. 4,198,488 to Drake, et al. teaches a further improvement to the method of Stamberger and involves the addition of a small amount (preferably 2.5 to 6 weight percent) of maleic anhydride to an acrylonitrile/styrene monomer feed. The maleic anhydride units are polymerized into the polymer backbone and also must undergo a separate esterification reaction with the hydroxyl groups of the primary polyol; and, accordingly, only small amounts of maleic anhydride can be employed without increasing the acid numbers of the polymer polyols formed. Acid numbers in excess of about 1.5 mg KOH/g are taught to be undesirable.

The present invention provides a stable polymer polyol dispersion from an α,β-ethylenically unsaturated dicarboxylic acid anhydride monomer such as maleic anhydride. The polymer polyol of the invention can be prepared in the absence of a nitrile monomer and without using modified (unsaturated) polyols. The advantage of a process which facilitates the production of a polymer polyol in the absence of acrylonitrile is obvious due to its high toxicity and its tendency to produce discolored dispersions resulting in scorched foams. Quite surprisingly, it was found that use of an α,β-ethylenically unsaturated dicarboxylic acid anhydride alone, without a nitrile monomer, resulted in grafting. Even more surprising was the discovery that the use of the acid anhydride resulted in a high level of grafting as compared to the use of a nitrile monomer.

According to this invention, there is provided a polymer polyol suitable for reaction with an isocyanate to form a polyurethane comprising the reaction product prepared at a temperature within the range of from about 70° C. to about 150° C. under free radical conditions from a minor amount of a monomer mixture and a major amount of an organic polyol medium wherein:

(a) the monomer mixture comprises at least one α,β-ethylenically unsaturated dicarboxylic acid anhydride and at least one monomer which is polymerizable with the acid anhydride;

(b) the organic polyol medium consists essentially of secondary hydroxyl terminated polyol; and wherein in the reaction product the acid anhydride is grafted to the polyol through the double bonds of the α,β-ethylenically unsaturated dicarboxylic acid anhydride and not through the hydroxyl groups of the polyol under the reaction conditions.

In one embodiment of this invention, the essential components of the polymer polyol is an α,β-ethylenically unsaturated dicarboxylic acid anhydride, a monomer polymerizable with the acid anhydride and a polyol.

The polyols suitable for use are one or more polyoxyalkylene polyether polyols which are the polymerization products of an alkene oxide or a mixture of alkene oxides with a polyhydric alcohol.

The polyol must contain secondary hydroxyl groups and may contain, as is typical, small amounts of unsaturation. The molecular weight of the polyol will be within the range of from about 100 to about 5,000, preferably from about 2,000 to about 3,500.

The monomer mixture according to the invention will comprise at least one α,β-ethylenically unsaturated dicarboxylic acid anhydride. Suitable anhydrides include maleic, itaconic, citraconic, 2,3-dimethylmaleic, and the like and their mixtures. Maleic anhydride is preferred.

Further, the monomer mixture will comprise at least one additional monomer which is polymerizable with the acid anhydride. Any suitable monomer or mixture of monomers can be employed. Styrenic monomers are preferred and include styrene, substituted styrenes such as α-methylstyrene, p-methylstyrene, and the like, and their mixtures. Styrene is the preferred styrenic monomer.

The anhydride/styrenic monomer mixture will contain at least 20 to about 50 weight percent of acid anhydride, with the balance being styrenic monomer. Preferably, at least 30 weight percent of the monomer mixture will be acid anhydride.

In a preferred embodiment, the anhydride/styrenic monomer mixture employed to produce the polymer polyols of this invention will contain from about 45 to about 50 weight percent maleic anhydride and from about 50 to about 55 weight percent styrene.

In the practice of the invention, the monomer mixture is employed in an amount within the range of from about 5 to about 45 weight percent, based on the total weight of the monomer mixture and the polyol. Preferably, the monomer mixture will be employed within the range of from about 15 to about 40 weight percent, based on the weight of the monomer mixture and the polyol.

Although the monomer mixture employed to produce the polymer polyols of the invention is preferably a mixture of anhydride and styrenic monomers, the mixture can also comprise additional monomers. Additional monomers which can be incorporated during the polymerization reaction include acrylates, methacrylates, acrylamides, and their derivatives, vinyl and vinylidene halides, and nitrile derivatives such acrylonitrile and methacrylonitrile. If one or more additional monomers are present during the polymerization reaction, it is possible to reduce the minimum amount of $\alpha,\beta$-ethylenically unsaturated acid anhydride in the monomer mixture from about 20 to about 10 weight percent.

The polymer polyol of the present invention can be produced by polymerizing the monomer mixture in the selected polyol at a temperature of from about 70° C. to about 150° C. in the presence of a catalytically effective amount of a conventional free radical catalyst known to be suitable for the polymerization of ethylenically unsaturated monomers. The concentration of the catalyst (initiator) can vary within the range of from about 0.5 to about 5 weight percent based on the weight of the monomer mixture. However, any amount sufficient to cause grafting is satisfactory. Illustrative catalysts are the well-known free radical types; for example, hydrogen peroxide, t-butyl peroctoate, lauryl peroxide, cumene hydroperoxide, t-butyl hydroperoxide, benzoyl peroxide, and azobis(isobutyronitrile).

Any conventional process for preparing polymer polyols can be employed to prepare the polymer polyols of this invention. Preferred is a process which maintains high agitation and a low monomer to polyol ratio throughout the reaction mixture during the process. Both semi-batch and continuous processes are suitable.

The polymerization can also be carrried out with an inert organic solvent present. The solvent must be non-reactive with the anhydride and must not interfere with the polymerization reaction. Illustrative thereof are toluene, benzene, acetonitrile, ethyl acetate, hexane, heptane, dicyclohexane, dioxane, acetone, N,N-dimethylformamide, N,N-dimethylacetamide, and the like, including those known in the art as being suitable solvents for the polymerization of vinyl monomers. When an inert organic solvent is used, it is preferably removed by conventional means.

The polymer polyols can be concerted into elastomeric polyurethane and/or polyisocyanurate resins and resin foams in the known manner by reaction with polyisocyanates. Suitable methods for converting polymer polyols into polyurethane and/or polyisocyanate resins and resin foams are taught in U.S. Pat. No. 4,198,488 and are incorporated herein by reference.

The invention is illustrated by the following examples.

EXAMPLE 1

This example demonstrates the preparation of a graft copolymer dispersion of the invention.

Into a 1 liter, 4 neck round-bottom flask equipped with a stirrer, condenser, thermometer, and addition tube, and under a blanket of nitrogen, was charged 320 parts by weight of Polyol A--a glycerin, propylene oxide, ethylene oxide adduct containing about 13% ethylene oxide and having a hydroxyl number of 56. After heating Polyol A to 110° C. and maintaining that temperature for about 30 minutes, the following monomer charge was added over a 2-hour period to give a milk-white dispersion.

| Monomer Charge | |
|---|---|
| Parts by Weight | Material |
| 60 | Styrene |
| 60 | Maleic Anhydride |
| 160 | Polyol A |
| 10 | Toluene |
| 15 | Methylene chloride |
| 3.0 | Azobis(isobutyronitrile) |

Upon completion of the addition, the dispersion was held at 100° C. for 30 minutes, then the reaction mixture was stripped for 2.5 hours at 90° C. and 1 mm Hg to yield a stable polymer polyol dispersion. The polymer polyol dispersion was found to have a viscosity of 5,564 cps (Brookfield cone and plate viscometer spindle #CP-52, 5 rpm @26° C.), a solids content by hexane extraction of 29.0%, and an average particle size of 1.0 microns (Coulter N4 Particle Size Analyzer). Upon dilution to 20% solids, the viscosity was 1,650 cps.

EXAMPLES 2-20

Using substantially the procedure of Example 1, 19 additional polymer polyols (Examples 2-20) were prepared. Examples 2-8 were prepared employing various concentrations of different initiators. Examples 9-11 were prepared employing various monomer ratios of styrene to maleic anhydride. Examples 12-20 were prepared employing a third monomer, either acrylonitrile, methylmethacrylate, or acrylamide, in addition to styrene and maleic anhydride. Following Table I and Table II show the amounts of materials employed and the resulting polymer polyol dispersion properties for Examples 1-11 and Examples 12-20, respectively. Amounts of polyols and monomers are in parts by weight.

TABLE I
EXAMPLES 1-11

| Example No. | Polyol[1] Charge | Polyol[1] Feed | Monomers Styrene | Monomers Maleic Anhydride | Initiator Type | Initiator Level[2] | Polymer Polyol Dispersion Properties Meas. Solids (Wt. %)[5] | Visc.[6] | Visc. at 20% Solids |
|---|---|---|---|---|---|---|---|---|---|
| 1 | 320 | 160 | 60 | 60 | AIBN[3] | 2.5 | 29.0 | 5,564 | 1,650 |
| 2 | 320 | 160 | 60 | 60 | AIBN | 4.0 | 28.0 | 5,160 | — |
| 3 | 320 | 160 | 60 | 60 | AIBN | 3.0 | 27.6 | 5,505 | — |
| 4 | 320 | 160 | 60 | 60 | AIBN | 1.7 | 26.9 | 4,384 | — |
| 5 | 320 | 160 | 60 | 60 | BPO[4] | 3.7 | 37.4 | (7) | — |
| 6 | 320 | 160 | 60 | 60 | BPO | 2.5 | 34.0 | 17,000 | 1,990 |
| 7 | 320 | 160 | 60 | 60 | BPO | 1.5 | 32.1 | 9,650 | 1,770 |
| 8 | 320 | 160 | 60 | 60 | BPO | 0.8 | 24.9 | 7,250 | — |
| 9 | 320 | 160 | 65 | 55 | AIBN | 2.5 | 25.8 | 6,800 | 2,300 |
| 10 | 320 | 160 | 70 | 50 | AIBN | 2.5 | 21.9 | 4,679 | — |

TABLE I-continued

EXAMPLES 1-11

| Example No. | Polyol[1] Charge | Polyol[1] Feed | Monomers Styrene | Monomers Maleic Anhydride | Initiator Type | Initiator Level[2] | Polymer Polyol Dispersion Properties Meas. Solids (Wt. %)[5] | Visc.[6] | Visc. at 20% Solids |
|---|---|---|---|---|---|---|---|---|---|
| 11 | 320 | 160 | 80 | 40 | AIBN | 2.5 | 20.8 | 18,000 | — |

[1] Polyol A of Example 1
[2] Weight Percent based on total monomer weight
[3] AIBN = azobis(isobutyronitrile)
[4] BPO = benzoyl peroxide
[5] Theoretical solids is 20.0 wt. %
[6] Viscosity at shear rate 10 sec$^{-1}$
[7] Not tested (paste)

TABLE II

EXAMPLES 12-20

| Example No. | Polyol[1] Charge | Polyol[1] Feed | Monomers Styrene | Monomers Maleic Anhydride | Monomers Other | Initiator Type | Initiator Level[2] | Polymer Polyol Dispersion Properties Meas. Solids (wt. %)[5] | Visc.[6] | Visc. at 20% Solids |
|---|---|---|---|---|---|---|---|---|---|---|
| 12 | 320 | 160 | 60.0 | 20.0 | 40.0(AN)[7] | AIBN[3] | 2.5 | 23.2 | 6,802 | 3,300 |
| 13 | 320 | 160 | 60.0 | 30.0 | 30.0(AN) | AIBN | 2.5 | 24.3 | 12,484 | 3,323 |
| 14 | 320 | 160 | 60.0 | 40.0 | 20.0(AN) | AIBN | 2.5 | 25.9 | 10,700 | 2,654 |
| 15 | 320 | 160 | 60.0 | 50.0 | 10.0(AN) | AIBN | 2.5 | 28.1 | 7,471 | 2,160 |
| 16 | 320 | 160 | 61.7 | 44.7 | 13.1(MMA)[8] | AIBN | 2.5 | 23.7 | 5,720 | 2,379 |
| 17 | 320 | 160 | 61.5 | 51.5 | 6.5(MMA) | AIBN | 2.5 | 25.0 | 3,794 | 1,710 |
| 18 | 320 | 160 | 61.5 | 54.7 | 3.3(MMA) | AIBN | 2.5 | 25.5 | 4,011 | 1,769 |
| 19 | 320 | 160 | 61.3 | 32.3 | 25.9(MMA) | AIBN | 2.5 | 21.9 | 11,167 | 5,603 |
| 20 | 320 | 160 | 65.9 | 31.0 | 22.5(AA)[9] | AIBN | 2.5 | 22.0 | 5,898 | 3,617 |

[1] Polyol A of Example 1
[2] Weight Percent based on total monomer weight
[3] AIBN = azobis(isobutyronitrile)
[4] BPO = benzoyl peroxide
[5] Theoretical solids is 20.0 wt. %
[6] Viscosity at shear rate 10 sec$^{-1}$
[7] AN = acrylonitrile
[8] MMA = methylmethacrylate
[9] AA = acrylamide

EXAMPLE 21

This example demonstrates that in the polymer polyols of this invention, the acid anhydride is grafted to the polyol through the double bonds of the α,β-ethylenically unsaturated dicarboxylic acid anhydride.

First, the hydroxy groups of a sample of Polyol A employed in Example 1 were reacted with acetyl chloride to produce a hydroxyl free, acetate terminated polyol. Analysis found less than 1% (0.004 meq./gm) of remaining or uncapped hydroxyl groups.

Next, using substantially the procedure of Example 1, a styrene-maleic anhydride dispersion was prepared in the hydroxyl-free, acetate terminated polyol.

The resulting polymer polyol was tested and found to possess the same stable, low viscosity properties as the dispersion of Example 1.

This example confirms that according to the invention, the grafting of the α,β-ethylenically unsaturated dicarboxylic acid anhydride occurs through the α,β-unsaturated double bond and not through esterification of the anhydride groups.

It will be evident from the foregoing that various modifications can be made to this invention. Such, however, are considered as being within the scope of the invention.

What is claimed is:

1. A polymer polyol suitable for reaction with an isocyanate to form a polyurethane comprising the reaction product prepared at a temperature within the range of from about 70° C. to about 150° C. under free radical conditions from a minor proportion of a monomer mixture and a major proportion of an organic polyol medium wherein:
    (a) the monomer mixture comprises at least one α,β-ethylenically unsaturated dicarboxylic acid anhydride and at least one monomer which is polymerizable with the acid anhydride;
    (b) the organic polyol medium consists essentially of secondary hydroxyl terminated polyol, and wherein in the reaction product the acid anhydride is grafted to the polyol through the double bonds of the α,β-ethylenically unsaturated dicarboxylic acid anhydride and not through the hydroxyl groups of the polyol under said reaction conditions.

2. The polymer polyol of claim 1 in which said α,β-ethylenically unsaturated dicarboxylic acid anhydride is maleic anhydride.

3. The polymer polyol of claim 1 in which said α,β-ethylenically unsaturated dicarboxylic acid anhydride is itaconic anhydride.

4. The polymer polyol of claim 1 in which said α,β-ethylenically unsaturated dicarboxylic acid anhydride is citraconic anhydride.

5. The polymer polyol of claim 1 in which said α,β-ethylenically unsaturated dicarboxylic acid anhydride is 2,3-dimethyl maleic anhydride.

6. The polymer polyol of claim 1 in which said α,β-ethylenically unsaturated dicarboxylic acid anhydride is selected from the group consisting of at least two anhydrides selected from the group consisting of maleic, itaconic, citraconic, and 2,3-dimethyl maleic.

7. The polymer polyol of claim 1 in which said copolymerizable monomer is a sytrenic monomer.

8. The polymer polyol of claim 7 in which said styrenic monomer is styrene.

9. The polymer polyol of claim 7 in which said styrenic monomer is α-methylstyrene.

10. The polymer polyol of claim 7 in which said styrenic monomer is ρ-methylstyrene.

11. The polymer polyol of claim 7 in which said styrenic monomer is selected from the group consisting of at least two styrenic monomers selected from the group consisting of styrene, α-methylstyrene, and ρ-methylstyrene 12. The polymer polyol of claim 1 in which said α,β ethylenically unsaturated dicarboxylic acid anhydride is employed in an amount of from about 10 to about 50 weight percent of the monomer mixture.

13. The polymer polyol of claim 1 in which said α,β-ethylenically unsaturated dicarboxylic acid anhydride is employed in an amount of from about 20 to about 50 weight percent of the monomer mixture.

14. The polymer polyol of claim 1 in which said α,β-ethylenically unsaturated dicarboxylic acid anhydride is employed in an amount of from about 30 to about 50 weight percent of the monomer mixture.

15. The polymer polyol of claim 1 in which said α,β-ethylenically unsaturated dicarboxylic acid anhydride is employed in an amount of from about 45 to about 50 weight percent of the monomer mixture.

16. The polymer polyol of claim 1 in which said monomer mixture is employed in an amount of from about 5 to about 45 weight percent based on the total weight of the monomer mixture and organic polyol.

17. The polymer polyol of claim 1 in which said monomer mixture is employed in an amount of from about 15 to about 40 weight percent based on the total weight of the monomer mixture and organic polyol.

18. A process for producing a polymer polyol which comprises polymerizing at a temperature within the range of from about 70° C. to about 150° C. in the presence of a free radical catalyst from about 5 to about 45 weight percent of a monomer mixture comprising at least one α,β-ethylenically unsaturated dicarboxylic acid anhydride and at least one monomer polymerizable with the acid anhydride dispersed in about 55 to about 95 weight percent of an organic polyol medium consisting essentially of secondary hydroxyl terminated polyol, said weight percents of the monomer mixture and the polyol medium being based on the total weight of the monomer mixture and the polyol medium, wherein said acid anhydride grafts to the polyol through the double bonds of the α,β-ethylenically unsaturated dicarboxylic acid anhydride.

19. A method for producing an elastomeric polyurethane which comprises reacting a mixture comprising a polymer polyol as claimed in claim 1, and an organic polyisocyanate in contact with a catalyst for the reaction of the polymer polyol and the polyisocyanate to produce a polyurethane.

20. The elastomeric polyurethane produced by the method of claim 19.

21. A method for producing a polyurethane foam which comprises reacting a polymer polyol as claimed in claim 1, and an organic polyisocyanate in contact with a catalyst for the reaction of the polymer polyol and the polyisocyanate, a blowing agent, and a foam stabilizer.

22. The polyurethane foam produced by the method of claim 21.

* * * * *